United States Patent
Neghina et al.

(10) Patent No.: US 9,106,551 B2
(45) Date of Patent: Aug. 11, 2015

(54) DATA PACKET FREQUENCY

(75) Inventors: Mihai Neghina, Craiova (RO);
Florin-Laurentiu Stoica, Sibiu (RO)

(73) Assignee: Freescale Semiconductor, Inc., Austin, TX (US)

( * ) Notice: Subject to any disclaimer, the term of this patent is extended or adjusted under 35 U.S.C. 154(b) by 772 days.

(21) Appl. No.: 12/672,312

(22) PCT Filed: Aug. 10, 2007

(86) PCT No.: PCT/IB2007/053187
§ 371 (c)(1),
(2), (4) Date: Feb. 5, 2010

(87) PCT Pub. No.: WO2009/022199
PCT Pub. Date: Feb. 19, 2009

(65) Prior Publication Data
US 2011/0149082 A1    Jun. 23, 2011

(51) Int. Cl.
*H04L 12/28* (2006.01)
*H04L 12/26* (2006.01)
*H04L 29/06* (2006.01)

(52) U.S. Cl.
CPC ............ *H04L 43/106* (2013.01); *H04L 65/608* (2013.01); *H04L 69/28* (2013.01); *H04L 43/0894* (2013.01); *H04L 43/16* (2013.01)

(58) Field of Classification Search
CPC ........................... H04L 43/106; H04L 47/263
USPC ........... 370/252, 235, 465; 348/500; 718/102; 709/224, 232; 340/901
See application file for complete search history.

(56) References Cited

U.S. PATENT DOCUMENTS

| | | | | |
|---|---|---|---|---|
| 5,987,493 A * | 11/1999 | Rangan et al. | ................ | 718/105 |
| 6,259,677 B1 * | 7/2001 | Jain | .............................. | 370/252 |
| 7,129,990 B2 | 10/2006 | Wredenhagen et al. | | |
| 7,457,868 B1 * | 11/2008 | Guo | ............................. | 709/224 |
| 7,643,422 B1 * | 1/2010 | Covell et al. | ..................... | 370/235 |
| 2004/0257469 A1 * | 12/2004 | Compton et al. | ............. | 348/500 |
| 2005/0063379 A1 | 3/2005 | Wybenga et al. | | |
| 2007/0025396 A1 | 2/2007 | Ajima | | |

(Continued)

FOREIGN PATENT DOCUMENTS

WO      2004/042949 A    5/2004

OTHER PUBLICATIONS

International Search Report and Written Opinion correlating to PCT/IB2007/053187 dated Jun. 2, 2008.

*Primary Examiner* — Wei Zhao
*Assistant Examiner* — Lionel Preval

(57) ABSTRACT

A method of determining a representative frequency for data packets, each data packet having an associated time, the method comprising: receiving a sequence of time-differentials, wherein a time-differential represents a difference between the time associated with a corresponding first data packet and the time associated with a corresponding second data packet; and determining the representative frequency based on the steps of: grouping a predetermined number N of the time-differentials into one or more groups based on the magnitudes of the N time-differentials; selecting one or more of the one or more groups for use in determining a representative time-differential; determining the representative time-differential as a function of the time-differentials of the selected one or more groups; outputting an inverse of the representative time-differential as the representative frequency.

18 Claims, 4 Drawing Sheets

(56) References Cited

U.S. PATENT DOCUMENTS

| | | | |
|---|---|---|---|
| 2007/0140306 A1* | 6/2007 | Klein | 370/516 |
| 2007/0257814 A1* | 11/2007 | Tilton et al. | 340/901 |
| 2008/0040501 A1* | 2/2008 | Harrang et al. | 709/232 |
| 2010/0215053 A1* | 8/2010 | Chakareski et al. | 370/465 |

* cited by examiner

DATA PACKET FREQUENCY

FIELD OF THE INVENTION

The present invention relates to a method of determining frequencies for data packets, an apparatus for carrying out such a method and a computer program which, when executed by a computer, carries out such a method.

BACKGROUND OF THE INVENTION

Packetisation of data for communication/transmission of the data is well known. Many example packetisation algorithms and communication protocols/standards exist, such as the Realtime Transport Protocol, RTP, (for more details, see http://www.rfc-editor.org/rfc/rfc3550.txt). These packetisation methods shall not be described in detail herein.

Generally speaking, though, the data that is to be communicated (transmitted) is divided into one or more blocks of data. Each block is communicated as a separate data packet. Various additional data is added to each block of data to form the corresponding data packet. This additional data may be supplied within a header of the data packet. The additional data may include an error correction and/or detection code, a sequence number and a time associated with the data packet and/or its data (represented as a timestamp). The error correction and/or detection code helps determine whether a data packet that has been received at a receiver has any errors or is error-free. If an error-correction code is used, it may be possible to correct any detected errors to obtain an error-free data packet. The sequence number enables a receiver to order received data packets into the order in which the data packets were originally transmitted (it being possible that the data packets are received out of order). The timestamp may provide an indication of the time at which the corresponding data packet was sent or of the time to which the data of that data packet corresponds (for example, the timestamp may represent the time at which the data of that data packet was originally captured, i.e. the moment when the data was sampled in order to be encoded).

There are many applications in which it is desirable to have an estimate of a frequency associated with the data packets. This frequency could be the frequency at which the data packets are transmitted. Alternatively, this frequency could relate to a frequency of the data contained within the data packets (such as a video frame-rate for data packets containing video data or an audio sampling-rate for data packets containing audio data). This estimate of the frequency is useful for applications such as video frame-rate detection, video frame-rate conversion (temporal transcoding), motion analysis, and audio up/down sampling.

However, currently proposed methods of determining an estimate of this frequency are not very accurate. In particular, it is desirable to have a method of estimating the frequency that still provides accurate estimates in situations in which (i) the timestamps for received data packets have constant increments; and/or (ii) some of the data packets are lost (or not received), thereby disrupting the sequence of received timestamps and their apparent relationship; and/or (iii) the timestamps for received data packets change in a non-standard or unexpected manner; and/or (iv) some of the data packets are not sent, i.e. the source of the data packets chooses to skip some data packets (e.g. one or more video frames may be dropped/omitted from the packet stream).

SUMMARY OF THE INVENTION

According to an aspect of the invention, there is provided a method according to the appended claims.

According to another aspect of the invention, there is provided an apparatus according to the appended claims.

According to other aspects of the invention, there is provided a computer program, a storage medium and a transmission medium according to the appended claims.

Various other aspects of the invention are defined in the appended claims.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader scope of the invention as set forth in the appended claims.

As will be described in more detail below, embodiments of the invention relate to a method of determining a representative frequency for data packets, each data packet having an associated time, the method comprising: receiving a sequence of time-differentials, wherein a time-differential represents a difference between the time associated with a corresponding first data packet and the time associated with a corresponding second data packet; and determining the representative frequency based on the steps of: grouping a predetermined number N of the time-differentials into one or more groups based on the magnitudes of the N time-differentials; selecting one or more of the one or more groups for use in determining a representative time-differential; determining the representative time-differential as a function of the time-differentials of the selected one or more groups; outputting an inverse of the representative time-differential as the representative frequency.

Figure 1:
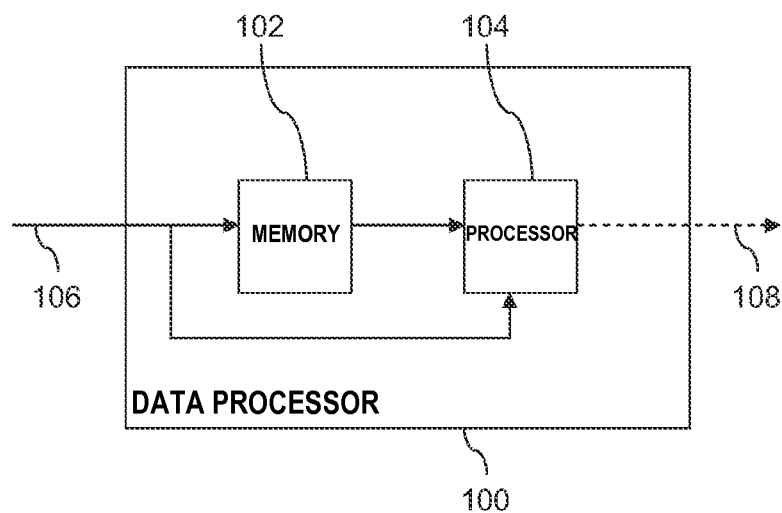
FIG. 1 schematically illustrates a data processor for carrying out a method according to an embodiment of the invention.

FIG. 1 schematically illustrates, as an example of an apparatus, a data processor 100 for carrying out a method according to an embodiment of the invention. The data processor 100 has a memory 102 and a processor 104. The data processor 100 receives input data packets via a communication channel 106. The data packets received by the data processor 100 may be stored in the memory 102 or may be supplied directly to the processor 104. The processor 104 performs processing on the data packets received by the data processor 100, as will be described in more detail below. The processor 104 may process data packets that it receives directly from the communication channel 106 and/or data packets that it reads from the memory 102.

For some applications, the output of the processing performed by the processor 104 may include a packetised data stream. For some applications, the output of the processing may include results data (such as statistical data or a velocity estimation). The output of the application being executed by the processor 104 may be supplied as an input to another application being executed by the processor 104. Alternatively, the data processor 100 may use an optional communication channel 108 to provide the output processed data. This communication channel 108 may be used, for example, to provide some or all of the output data to another data processing apparatus. This output data may be supplied to the other data processing apparatus via a communication network, such as the Internet, an intranet, a wide area network, a metropolitan area network, or any other suitable communication system. Alternatively, some or all of the processed output data may be stored in the memory 102 or on a different recording medium (not shown), such as a magnetic or optical disc, a tape or a solid-state storage device (such as a flash memory). Furthermore, the data processor 100 may be arranged to display or relate the processed output data to a user, for example via a visual and/or audible presentation of the output data.

In the description that follows, the input data packets are data packets formatted and generated accorded to the RTP standard. However, it will be appreciated that embodiments of the invention may make use of any packetisation algorithm/protocol/standard in which the data packets have an associated time (which may be represented by a timestamp). This is the case for RTP data packets. The header of an RTP data packet has a 32-bit timestamp field that is used to represent a date and/or time associated with that data packet. The use of the term "time" in this description includes times, dates and date-time combinations.

Additionally, in the description that follows, the data being communicated (or transmitted) via the RTP data packets is video data. However, it will be appreciated that embodiments of the invention are not limited to video data packets. The data being communicated may be any other kind of data, such as audio data, audio/video data, text data, multimedia data, financial data, statistical data, experiment data, etc.

In the description that follows, the timestamp field of the RTP data packets is arranged such that a 1-second increment of the time associated with a data packet corresponds to an increment of 90000 in the timestamp field of the data packet. This shall be used as the basis/reference for various threshold values that will be described later. However, it will be appreciated that other levels of accuracy and data resolution can be used accordingly for the timestamp field of the RTP data packet, and the various threshold values described below may be adapted accordingly for a specific data processing application.

As will be described in more detail below with reference to FIGS. 2, 3 and 4, embodiments of the invention determine representative frequencies for received data packets. The representative frequencies may represent a frequency of transmission of the data packets (for example, in embodiments in which a timestamp represents a time of transmission of the data packet). Alternatively, the representative frequencies may represent a frequency related to the data being transmitted (such as a video frame-rate when the data being transmitted is video data and the timestamp represents a sampling time for the video data of the data packet). The processor 100 may use these representative frequencies for a variety of applications.

As an example application executed by the processor 104, the data processor 100 may be arranged to receive input video data packets with an arbitrary frame-rate and output video data packets with a desired frame-rate. The processor 104 therefore performs frame-rate conversion. However, to do this well, the processor 104 needs accurate estimations of the current frame-rate of the input video. The determination of the frame-rate using the representative frequencies will be discussed in more detail below.

In a further example application executed by the processor 104, the representative frequencies that are derived from the video data packets are used to estimate the frame rate for the video data, which is then used to estimate the velocity of an object represented within the video data. If the frame rate is estimated to be R and the object is known to have moved a distance D within a known number F for video frames, then the velocity of that object can be estimated based on the value D*R/F. The values of D and F could be input by a user or could be received at the data processor 100 via a communications channel. This application could be used, for example, for analysing speeds of vehicles or sports balls/projectiles.

As discussed below with reference to FIGS. 2, 3 and 4, when the timestamp represents the time of transmitting data packets, a representative frequency reflecting an estimate of the frequency of transmission of the data packets can be determined by analysing the timestamps of the received data packets.

In other embodiments, the timestamp of a data packet represents the time corresponding to the data of that data packet. For example, for video data transmitted by RTP, the timestamp represents a time at which the video data was sampled/captured. The data sampled at a particular time may be contained within one or multiple data packets. For example, for video data, it is common for the data of a single video frame to be contained within multiple data packets. Furthermore, the number of data packets may change from video frame to video frame (for example, in long-GOP MPEG2 video encoding, an I-frame may use more data packets than a B- or P-frame). The data packets having data with the same corresponding time will then have the same timestamp. These data packets (or their data) may be considered to be a single data unit with a single timestamp, and a frequency for the data of the data unit is then estimated.

For example, if a frame of video is contained within several data packets, then those data packets may have the same timestamp, as each of the data packets for that frame of video has data corresponding to the same sampling time. When each video frame is contained within its own data packet, the above-mentioned method (FIGS. 2, 3 and 4) that can be used to estimate the frequency of transmission of the data packets can be used to estimate the video frame-rate. For example, if each frame of video is contained within a single separate data packet, and a representative frequency of transmission for the data packets is calculated as 25 Hz, then an estimate of the frame rate for the video is 25 frames-per-second. When a frame of video is contained within multiple data packets, the data packets containing the data for a single frame will use the same timestamp (to indicate that their data relates to the same sampling point in time). This, though, is catered for by the frequency calculation described below with reference to FIGS. 2, 3 and 4. In this case, the representative frequency determined from the data packets can still be used as a frame-rate estimation. The representative frequency is a frequency for the data unit made up of the multiple data packets (or their data) for that video frame.

It is worth noting that the sampling time for data of a data packet may be different from the transmission time of that data packet. For example, the transmission time may be the sampling time plus any encoding time and delays in actually deciding to transmit the video.

Whilst the particular application being executed by the processor 104 may, at some stage, rely on the nature/type of the data as part of its processing, the actual processing steps performed as part of embodiments of the invention do not rely on the nature of the data. However, some of the threshold values used in embodiments of the invention (and that will be described in detail below) may be set in the knowledge of the typical values that can be expected for a particular application and data type.

Figure 2:
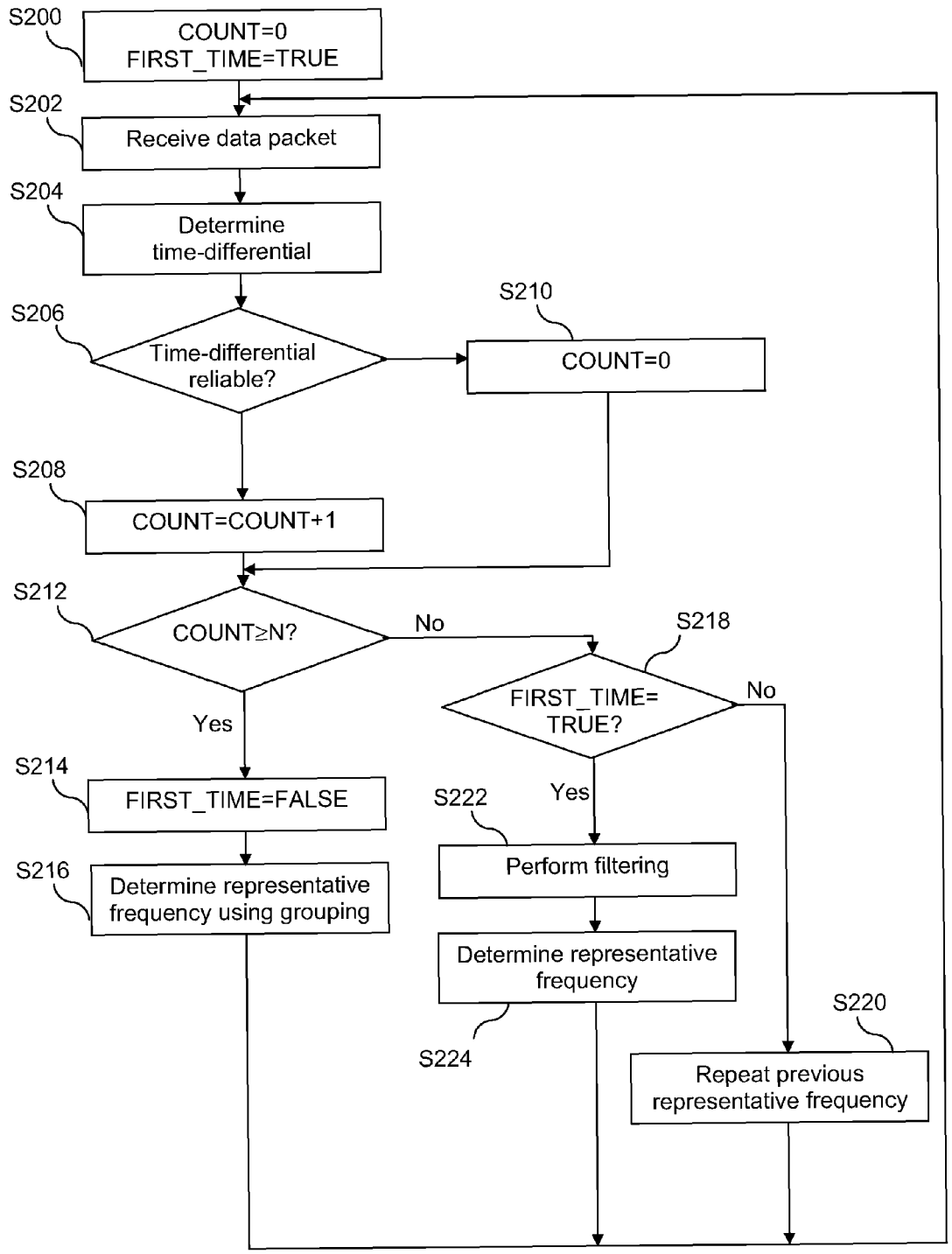
FIG. 2 is a schematic flowchart illustrating a method according to an embodiment of the invention.

FIG. 2 is a schematic flowchart illustrating a method according to an embodiment of the invention. This method is carried out by the processor 104 to determine a representative frequency for data packets that the data processor 100 has received. As discussed above, this processing may be part of an application, being executed by the processor 104, that uses the representative frequencies.

At a step S200, two variables, COUNT and FIRST_TIME are initialised to the values of 0 and TRUE respectively. The purpose of these variables will be described in more detail later.

At a step S202, an input data packet is received. Each received data packet has an associated time, as represented by timestamp data within the received data packet. The data packets are received at the step S202 in their timestamp order (i.e. non-decreasing timestamp order). It will be appreciated that some data packets may have been lost (i.e. have not been received). In some embodiments, the order of transmission (as identified by the sequence numbers) may be different to the order of data sampling (as identified by the timestamps). This happens, for example, in long-GOP MPEG2 video encoding, as is known in this field of technology. In such situations, the data processor 100 may have reordered the data packets using their timestamps (and, if two data packets have the same timestamp, the sequence number too) to determine the correct order for processing the data packets. The data packets are thus processed in non-decreasing timestamp order.

At a step S204, a time-differential is determined for the data packet. Throughout this description, the time-differential for the i-th data packet shall be represented by the value $x(i)$. The time-differential calculated at the step S204 represents the difference between the time associated with the data packet received at the step S202 and the time associated with the previous data packet received at the step S202. This time-differential is calculated as a difference between the timestamp data of the currently received data packet and the timestamp data of the immediately preceding data packet. Using the above-mentioned resolution for the timestamp, a time-differential of 90000 represents a difference of 1-second between the two data packets.

Additionally, at the step S204, a check may be performed to determine whether the time-differential is more than a threshold value, IN_MAX. If the time-differential is more than IN_MAX then the time-differential output from the step S204 is set to be the same as the time-differential previously output from the step S204 when the step S204 was last executed. If no such previously output time-differential exists, then a default value is used. However, some embodiments do not make use of the threshold value IN_MAX in this manner.

Additionally, at the step S204, a check may be performed to determine whether the time-differential is less than a threshold value, IN_MIN. If the time-differential is less than IN_MIN then the time-differential output from the step S204 is set to be the same as the time-differential previously output from the step S204 when the step S204 was last executed. If no such previously output time-differential exists, then a default value is used. However, some embodiments do not make use of the threshold value IN_MIN in this manner.

The use of IN_MIN, though, provides for frequency determination even when the time-differential is 0, i.e. when successive data packets have the same timestamp. This is advantageous when the data for a video frame is contained within several data packets. Using IN_MIN sets the time-differential to an effective time-differential that would have resulted from using a single data packet per video frame.

Example values for IN_MAX and IN_MIN are 45000 and 500 respectively. This corresponds to limiting the possible output representative frequencies to a range from 90000/45000=2 Hz to 90000/500=180 Hz (which, for video data, is a range from 2 frames-per-second to 180 frame-per-second). It will be appreciated that other values could be used according to the specific application and the nature of the data being processed.

As will be discussed in more detail below, the use of IN_MAX and IN_MIN may be omitted from the step S204. Instead, IN_MAX and IN_MIN may be used at a later step (a step S222 to be discussed below) instead.

Next, at a step S206, the reliability of the time-differential output from the step S204 is checked. The time-differential is said to be reliable if it has been derived, or determined, from two input data packets that are both error-free.

If a data packet uses an error-detection code, then the error-free status of that data packet can be determined from the error-detection code. If the error-detection code indicates that the data packet has an error, then a time-differential derived from that data packet is not reliable. Error-detection codes are well-known and shall not be described in detail herein.

If a data packet uses an error-correction code, then the error-free status of that data packet can be determined from whether or not any errors in the data packet can be corrected. If there are no errors in the data packet, then the data packet is, naturally, error free. If there are errors in the data packet and these errors can be corrected, then the corrected data packet is error-free and a reliable time-differential can be derived from that corrected data packet (and another error free data packet); otherwise, the data packet has an uncorrectable error and a time-differential derived from that data packet is not reliable. Alternatively, the error-correction code may be used in a similar manner to an error-detection code, i.e. if the error-correction code indicates that the data packet has an error, then a time-differential derived from that data packet is not reliable. Error-correction codes are well-known and shall not be described in detail herein.

In some embodiments, a time-differential is said to be reliable if it has been derived, or determined, from two input data packets that are both error-free and have consecutive sequence numbers (i.e. no packet loss has occurred between the two data packets).

In some embodiments, a time-differential is said to be reliable if it has been derived, or determined, from two input data packets that are both error-free and which represent consecutive video frames (i.e. the data packets represent two different video frames and no frame loss has occurred between these two video frames).

If, at the step S206, it is determined that the time-differential is reliable, then processing continues at a step S208, at which the variable COUNT is incremented by 1; otherwise processing continues at a step S210, at which the variable COUNT is reset to the value 0. In this way, the variable COUNT is used to maintain a record of how many successive reliable time-differentials there are in the most recent time-differentials, i.e. the length of the series of reliable time-differentials counting back from the current time-differential. In other words, if COUNT is zero, then the current time-differential x(i) for the current i-th data packet is not reliable, whereas if COUNT is non-zero, then the time-differentials x(i), x(i−1), . . . x(i−COUNT+1) are reliable.

At a step S212, it is determined whether the value of COUNT is at least a predetermined threshold value N, i.e. whether at least the most recent N time-differentials are reliable. In other words, if the current data packet is the i-th data packet, it is determined whether x(i), x(i−1), . . . , x(i−N+1) are reliable.

In some embodiments of the invention, the value of N is 30, although other values, such as 20 or 40, may be used instead. However, the value of N=30 has been found to be particularly suitable for video data and produces particularly good/accurate frequency estimations.

If it is determined that the value of COUNT is at least N, then processing continues at a step S214; otherwise, processing continues at a step S218.

At the step S214, the value of the variable FIRST_TIME is set to be FALSE. Then, at a step S216, a representative frequency for the input data packets is determined based on grouping/clustering. Throughout this description, the representative frequency output after the i-th data packet has been processed shall be represented by the value y(i). The grouping/clustering will be described in more detail below with reference to FIG. 3. Processing then returns to the step S202.

At the step S218, it is determined whether the value of FIRST_TIME is TRUE. It will be appreciated that the step S218 can be reached in a number of ways: (i) the number of data packets that have been received is less than N; (ii) the number of data packets that have been received is at least N, but there has not yet been N successive reliable time-differentials; or (iii) the number of data packets that have been received is at least N, there has been N successive reliable time-differentials, but the most recent N time-differentials are not all reliable. In the last case (iii), the value of FIRST_TIME will be FALSE, having been set to FALSE at the step S214 when the previous N successive reliable time-differentials were received. In the first two cases (i) and (ii), the value of FIRST_TIME will be TRUE, as the steps S214 and S216 will not have been executed yet. In this way, the variable FIRST_TIME is used to indicate whether or not the steps S214 and S216 have been executed yet, i.e. whether the grouping/clustering at the step S216 has been performed yet.

If the value of FIRST_TIME is FALSE, then processing continues at a step S220, at which the representative frequency for the input data packets that was most recently determined at the step S216 is output again as a representative frequency for the input data packets. Processing then returns to the step S202.

However, if the value of FIRST_TIME is TRUE, then processing continues at a step S222, at which at least some of the received time-differentials are filtered to produce a representative time-differential for the input data packets. In some embodiments, the filtering is performed according to the following equation:

$$\hat{x}(i) = \frac{15}{16}\hat{x}(i-1) + \frac{1}{16}x(i)$$

where $\hat{x}(i)$ is the output of the filter for the i-th data packet. For the very first data packet (i=1), the value of $\hat{x}(0)$ that is needed to produce the value of $\hat{x}(1)$ is set to a default value. This default value could be, for example, 3000 (which corresponds to a frequency of 90000/3000=30 Hz, or, for video data, 30 frames-per-second). Other default values could be used depending on the particular application being executed by the data processor 100.

It will be appreciated that the filtering performed at the step S222 may use an alternative filter. For example different filter coefficients may be used and a different number of filter taps may be used. The filter may be linear, non-linear, finite impulse response, or infinite impulse response.

Additionally, the output of the filter for the i-th data packet $\hat{x}(i)$ may be limited to be within a range around the previous filter output, $\hat{x}(i-1)$, i.e. if $\hat{x}(i) > \hat{x}(i-1) + \alpha_1$, (for some positive value $\alpha_1$) then $\hat{x}(i)$ is set to be $\hat{x}(i-1) + \alpha_1$, whilst if $\hat{x}(i) < \hat{x}(i-1) - \alpha_2$ (for some positive value $\alpha_2$) then $\hat{x}(i)$ is set to be $\hat{x}(i-1) - \alpha_2$. The values of $\alpha_1$ and $\alpha_2$ may be predetermined. Alternatively, in some embodiments, $\alpha_1$ and $\alpha_2$ are a predetermined percentage of $\hat{x}(i-1)$, such as 5%.

Then, at a step S224, the inverse of the representative time-differential for the current data packet, $\hat{x}(i)$, is output as a representative frequency y(i) for the input data packets. Processing then returns to the step S202.

Thus, the steps S222 and S224 represent an initialisation phase that uses filtering to produce representative frequencies for the data packets until a sequence of N consecutive reliable time-differentials have been received. Once the stage has been reach at which a sequence of N consecutive reliable time-differentials have been received, the representative frequencies for the data packets are produced based on the grouping/clustering method of the step S216 (and FIG. 3) (be that directly or as a repetition of a previous value at the step S220).

As mentioned above, the above-described use of the thresholds IN_MIN and IN_MAX at the step S204 could be performed at the step S222 instead. The above-described processing using the thresholds IN_MIN and IN_MAX may be performed prior to, or after, the filtering processing performed at the step S222.

Figure 3:
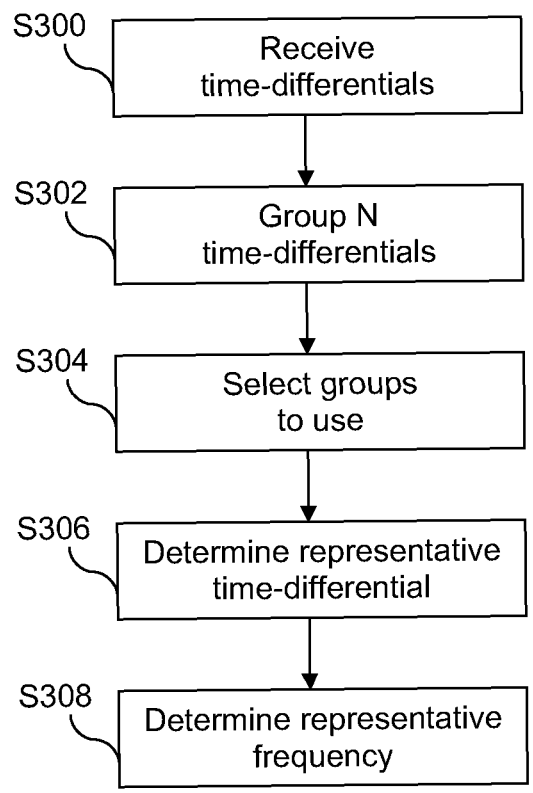
FIG. 3 is a schematic flowchart illustrating a grouping/clustering method performed at a step of FIG. 2.

FIG. 3 is a schematic flowchart illustrating the grouping/clustering method performed at the step S216 of FIG. 2.

At a step S300, the currently determined time-differential is received.

As will be discussed in more detail below, in the grouping/clustering method, a representative frequency for the data packets is determined from N consecutive reliable time-differentials. Due to the test performed at the step S212 of FIG. 2, there will be at least N consecutive reliable time-differentials available. However, the run of consecutive reliable time-differentials making up the most recent time-differentials may be longer than N time-differentials. The choice of which N consecutive reliable time-differentials, out of the run of N or more available consecutive reliable time-differentials that have been most recently received, to use to determine the representative frequency for the data packets will be described in more detail later.

At a step S302, the N consecutive reliable time-differentials to be used, (x(i), x(i−1), . . . , x(i−N+1)), are grouped together into one or more groups (or clusters) based on their magnitude or size. These groups are generated, or defined, as follows.

Initially, there are no groups. The N time-differentials are processed in an order to generate the groups. It will be appreciated that any order may be used for processing the N time-differentials. However, in an embodiment of the invention, the N time-differentials are processed from the earliest (oldest) one, i.e. x(i−N+1), to the latest (newest) one, i.e. x(i).

As will be discussed below, each group (or cluster) is defined by a corresponding time-differential value. This corresponding time-differential may be one of the N time-differentials, or may be an alternative value. The corresponding time-differential defining a group shall be referred to as the prototype time-differential for that group.

When a time-differential is processed, a check is made to determine which, if any, of the existing groups that time-differential belongs to. The groups are checked in order. A time-differential belongs to a group if it lies within a predetermined range of the prototype for that group, i.e. a time-differential x lies in a group that has p as its prototype, if $p-\delta_1 \leq x \leq p+\delta_2$, for some thresholds/margins $\delta_1$ and $\delta_2$. The values of $\delta_1$ and $\delta_2$ may be the same or may be different. In some embodiments of the invention, $\delta_1=\delta_2=25$. However, it will be appreciated that other values for $\delta_1$ and $\delta_2$ may be used.

If the time-differential being processed belongs to the group being checked, then it is added to that group and processing moves to the next time-differential. However, if the time-differential does not belong to any of the existing groups, then a new group is defined using that time-differential as its prototype.

An example is provided in the table below. In this example, a time-differential belongs to a group if it is within 25 of the prototype for that group, i.e. $\delta_1=\delta_2=25$. In the table below, an underlined value is a prototype value for the corresponding group.

| Process stage | Time-differential | Group 1 | Group 2 | Group 3 |
|---|---|---|---|---|
| 0 | — | Not defined | Not defined | Not defined |
| 1 | 800 | {800} | Not defined | Not defined |
| 2 | 850 | {800} | {850} | Not defined |
| 3 | 820 | {800, 820} | {850} | Not defined |
| 4 | 810 | {800, 820, 810} | {850} | Not defined |
| 5 | 880 | {800, 820, 810} | {850} | {880} |
| 6 | 850 | {800, 820, 810} | {850, 850} | {880} |
| 7 | 870 | {800, 820, 810} | {850, 850, 870} | {880} |

Initially, at stage 0 when none of the N time-differentials have been process, no groups have been defined yet.

At stage 1, for the 1st time-differential value of 800, no groups have been defined yet. Hence, a new group, Group 1, is defined as having 800 as its prototype. Group 1 then contains the 1st time-differential 800.

At stage 2, the 2nd time-differential value of 850 does not lie within the range 800−25 to 800+25, and so does not belong Group 1. No other groups have been defined yet. Hence, a new group, Group 2, is defined as having 850 as its prototype. Group 2 then contains the 2nd time-differential 850.

At stage 3, the 3rd time-differential value of 820 lies within the range 800−25 to 800+25, and so belongs to Group 1. Group 1 now has 2 elements.

At stage 4, the 4th time-differential value of 810 lies within the range 800−25 to 800+25, and so belongs to Group 1. Group 1 now has 3 elements.

At stage 5, the 5th time-differential value of 880 does not lie within the range 800−25 to 800+25, and so does not belong Group 1. It also does not lie within the range 850−25 to 850+25, and so does not belong Group 2. No other groups have been defined yet. Hence, a new group, Group 3, is defined as having 880 as its prototype. Group 3 then contains the 5th time-differential 880.

At stage 6, the 6th time-differential value of 850 does not lie within the range 800−25 to 800+25, and so does not belong Group 1. However, it does lie within the range 850−25 to 850+25, and so belongs Group 2. Group 2 then contains the 6th time-differential 850. Although Group 2 already contains a time-differential with the same value, the 6th time-differential 850 is added to Group 2, so that Group 2 now has 2 elements.

At stage 7, the 7th time-differential value of 870 does not lie within the range 800−25 to 800+25, and so does not belong Group 1. However, it does lie within the range 850−25 to 850+25, and so belongs Group 2. Group 2 then contains the 7th time-differential 870. Group 2 now has 3 elements.

It will be appreciated that the time-differential value of 870 also lies in the range 880−25 to 880+25. Thus, if Group 3 had been checked before Group 2 had been checked, then the time-differential value of 870 would, at stage 7, have been added to Group 3 instead of Group 2. To avoid such potential overlaps of the possible ranges spanned by different groups, when a new group is defined, its prototype could be modified to ensure that there is no possible overlap between the newly defined group and any one of the existing groups. For example, the prototype for Group 3 could, at stage 5, have been adjusted to be 900 instead of 880. Whilst Group 3 would not contain the value of 900, but the actual value of 880, it would use the value of 900 as its prototype, thereby ensuring that there was not an overlap between it and Group 2. Alternatively, or additionally, the values of $\delta_1$ and $\delta_2$ used for a newly defined group could be adjusted to ensure that it does not overlap with an existing group. For example, $\delta_1$ could be set to 5 for Group 3, whilst $\delta_2$ could be maintained as 25, thereby ensuring that Group 3 does not overlap with Group 2. Alternatively, $\delta_1$ could be adjusted for Group 3 and $\delta_2$ could be adjusted for Group 2 when defining Group 3 to ensure that Groups 2 and 3 do not overlap.

A priori analysis of the typical values for the time-differentials combined with sufficiently small values for $\delta_1$ and $\delta_2$ may be used to ensure that, in practice, the groups that are defined never actually overlap.

It will be appreciated that these groups could be defined using different processing steps. For example, Group 1 could be defined using the 1st time-differential value 800 as its prototype. A check could then be made to see which of the remaining time-differentials belong to Group 1, namely the 3rd and 4th time-differentials. As not all of the time-differentials have been grouped, Group 2 could be defined using the next available time-differential (the 2nd time-differential value 850) as its prototype. A check could then be made to see which of the remaining time-differentials belong to Group 2, namely the 6th and 7th time-differentials. As not all of the time-differentials have been grouped, Group 3 could be defined using the next available time-differential (the 5th time-differential value 880) as its prototype.

Additionally, it will be appreciated that other methods of grouping the N time-differentials based on their magnitude or size could be used. For example, predetermined ranges (such as 750 to 800, 800 to 850, 850 to 900, 900 to 950, etc.) could be used (without reference to the actual time-differentials that have been received). The time-differentials that are received can then be grouped together in the appropriate predetermined ranges.

Next, at a step S304, one or more of the one or more groups are selected for determining a representative frequency for the data packets.

A group is said to be valid if:
a) The group contains more than a threshold number GROUP_SIZE_MIN of time-differentials as elements. In some embodiments of the invention in which N=30, the value of GROUP_SIZE_MIN is 5. However, it will be appreciated that GROUP_SIZE_MIN may assume other values, and could be determined as a percentage of the value of N.

b) The prototype of the group is not less than a threshold value PROTOTYPE_MIN. In some embodiments of the invention the value of PROTOTYPE_MIN is 90 (setting a corresponding upper bound on representative frequency of 90000/90=1000 Hz). However, it will be appreciated that PROTOTYPE_MIN may assume other values.

c) The prototype of the group is not greater than a threshold value PROTOTYPE_MAX. In some embodiments of the invention the value of PROTOTYPE_MAX is 45000 (setting a corresponding lower bound on representative frequency of 90000/45000=2 Hz). However, it will be appreciated that PROTOTYPE_MAX may assume other values.

As mentioned above, the processing using threshold values IN_MIN and IN_MAX may be performed at the step S204 of FIG. 2 or at the step S222 of FIG. 2. In embodiments that perform processing using threshold values IN_MIN and IN_MAX at the step S204, the conditions b) and c) above may be omitted.

If the combined number of time-differentials of all of the valid groups is at least a threshold TOTAL_ELEMENTS, then the groups selected for use in determining the representative frequency are only the valid groups. Otherwise, all of the groups (both valid and invalid) are selected for use in determining the representative frequency.

In some embodiments, the value of TOTAL_ELEMENTS is set as a percentage of the value of N. For example, TOTAL_ELEMENTS may be set to be 50% of the value of N, so that when N=30, TOTAL_ELEMENTS=15. It will be appreciated that other percentages could be used instead. Alternatively, the value of TOTAL_ELEMENTS may be set by other means, such as simply specifying an absolute value, independent of N.

At a step S306, a representative time-differential for the data packets is determined as a function of the time-differentials of the selected groups. In an embodiment of the invention, if all of the elements of the groups selected at the step S304 are $\{a_i : i=1 \ldots n\}$, a representative time-differential b is calculated as an average of these elements $\{a_i : i=1 \ldots n\}$, i.e.

$$b = \frac{1}{n} \sum_{i=1}^{n} a_i. \quad 1)$$

However, it will be appreciated that other averages could be used, such as the mean or mode of $\{a_i : i=1 \ldots n\}$, and that other functions could be used to determine the representative time-differential b, such as:

$$b = \left( \prod_{i=1}^{n} a_i \right)^{1/n}; \quad 2)$$

or $$b = \frac{n}{\sum_{i=1}^{n} \frac{1}{a_i}}; \quad 3)$$

or $$b = \left( \frac{1}{n} \sum_{i=1}^{n} a_i^p \right)^{1/p} \quad 4)$$

where p is non-zero. (When p=1, the resulting equation provides the arithmetic mean as expressed in equation 1) above; whilst when p=−1, the resulting equation provides the harmonic average as expressed in equation 3) above).

Then, at a step S308, the inverse of the representative time-differential b is output as a representative frequency for the input data packets.

The particular choice of which N consecutive time-differentials to use for the above processing of FIG. 3 is as follows. At the beginning, when the length of the run of consecutive reliable time-differentials is only of length N, these are the N time-differentials to use. A predetermined value W is used such that W consecutive representative frequencies output from the step S216 of FIG. 2 are based on these N time-differentials. As such, once the first representative frequency has been output at the step S216, the processing of FIG. 3 need not necessarily be performed again for the 2nd to the W-th output representative frequency—instead, the 1st representative frequency can be repeated when the 2nd to the W-th output representative frequencies are to be calculated at the step S216, as they are based on the same N time-differentials. Then, the next W representative frequencies are based on the (W+1)-th to the (W+N) time-differentials, then the next W representative frequencies are based on the (2W+1)-th to the (2W+N) time-differentials, and so on.

In some embodiments of the invention, the value of W is the same as N. However, the value of W may be less than N or may be more than N.

Of course, once an unreliable time-differential has been received, the length of the run of reliable time-differentials is reset to be 0 (at the step S210). Once a new run of N reliable consecutive time-differentials has been received, the process of selecting N time-differentials to use for the FIG. 3 processing starts again for the new run of reliable time-differentials.

Figure 4:
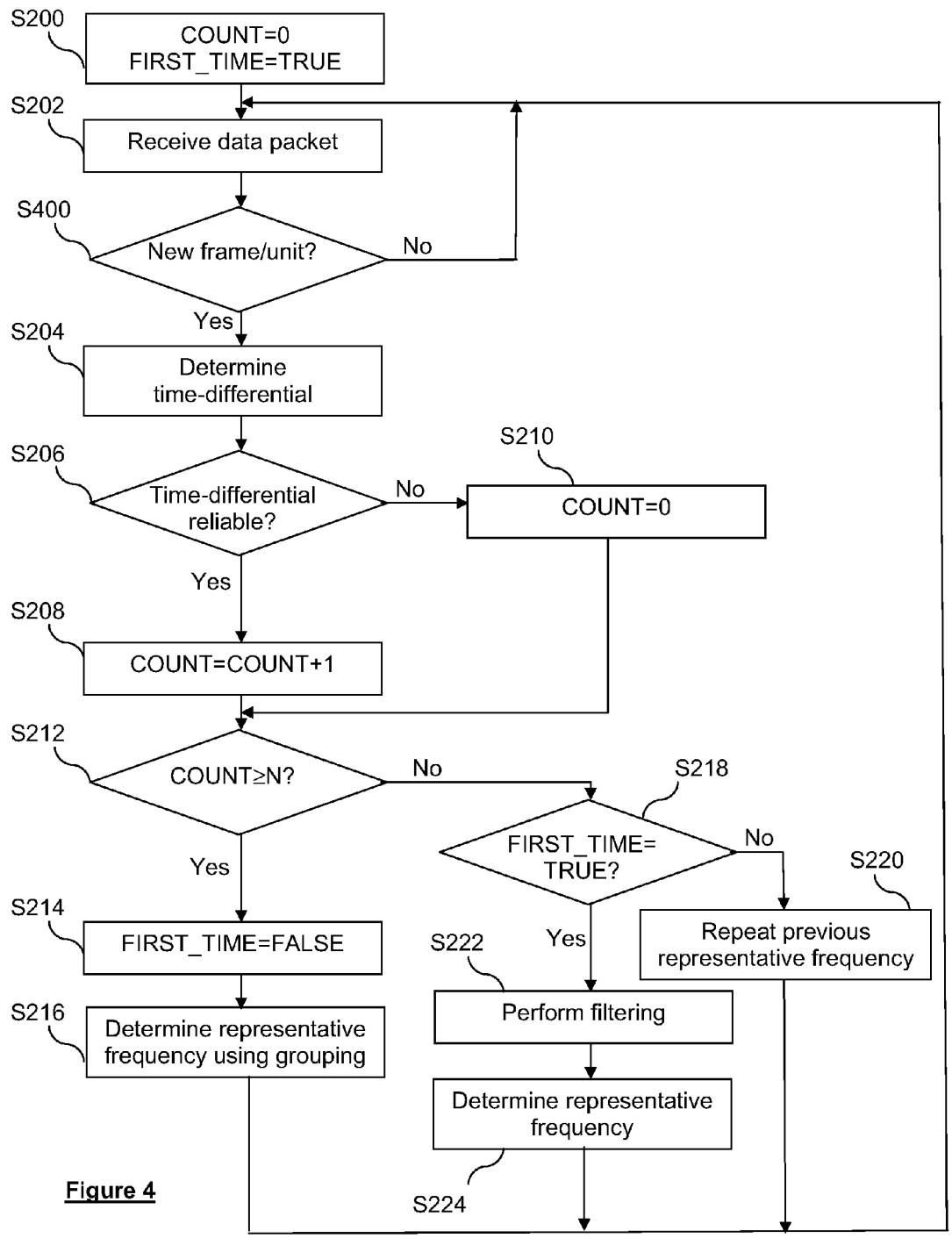
FIG. 4 is a schematic flowchart illustrating a method according to an embodiment of the invention.

FIG. 4 is a schematic flowchart illustrating a method according to an embodiment of the invention. This method is carried out by the processor 104 to determine a representative frequency for data packets that the data processor 100 has received. As discussed above, this processing may be part of an application, being executed by the processor 104, that uses the representative frequencies.

The flowchart of FIG. 4 is the same as the flowchart of FIG. 2, except that a new step S400 is included. The remaining steps of FIG. 4 are the same as those of FIG. 2, and a description of their functionality shall therefore not be repeated.

The step S400 is performed between the steps S202 and S204. At the step S400, it is determined whether the data of the data packet received at the step S202 belongs to the same unit (in terms of sampling time) as the data of the data packet previously received at the step S202. For video data, this amounts to determining whether the data packet received at the step S202 is for the same video frame as the data packet previously received at the step S202. This determination may be based on a comparison of the timestamps of the currently received and previously received data packets—if they are the same, then they relate to the same data unit.

If, at the step S400, it is determined that the data of the data packet received at the step S202 belongs to the same unit (in terms of sampling time) as the data of the data packet previously received at the step S202 (i.e. for video data that the data packet received at the step S202 is for the same video frame as the data packet previously received at the step S202), then processing returns to the step S202; otherwise processing continues at the step S204.

In this way, the time differentials used at subsequent steps in FIG. 4 relate to different data units/video frames.

It will be appreciated that the step S400 may be performed between the steps S204 and S206 instead by determining whether a time-differential is 0-valued instead of comparing timestamps. In this case, only time-differentials for different data units/video frames are passed to the step S206.

In the embodiment shown in FIG. 4, the use of the thresholds IN_MIN and PROTOTYPE_MIN may be omitted, as 0-valued time-differentials will not be processed.

The above described embodiments provide several different ways of handling the situation in which data for a data unit/video frame is contained within multiple consecutive data packets, including:

a) if the threshold IN_MIN is used at the step S204 in FIG. 2, then 0-valued time-differentials are set to a value representing a time-differential that may otherwise have occurred if the data had been contained within a single data packet;

b) if the threshold IN_MIN is used at the step S222 in FIG. 2, then (i) when performing the filtering, 0-valued time-differentials are set to a value representing a time-differential that may otherwise have occurred if the data had been contained within a single data packet; and (ii) when performing the grouping in FIG. 3, the use of the threshold PROTOTYPE_MIN helps set a group with 0-valued prototypes to be invalid;

c) if the step S400 of FIG. 4 is used, then only time-differentials calculated from differential data units/video frames are used.

Several variations of the above-described methods exist. For example, the calculation of a time-differential was described above as being the difference between the timestamps of consecutive data packets. However, it will be appreciated that the timestamps used need not be from consecutive/successive data packets. For example, the timestamps from every n-th data packet could be used. The representative frequencies determined could then be multiplied by this value n to yield representative frequencies for all of the data packets (as opposed to frequencies for the every n-th data packet). This can be used to decrease the amount of processing required.

Additionally, whilst the above description has described receiving and processing a single data packet at a time, it will be appreciated that multiple data packets may be received and processed in parallel.

Furthermore, the steps S218 and S220 may be omitted, so that whenever an unreliable time-differential is received, filtering is used at the step S222 until a new sequence of N successive reliable time-differentials has been received.

In some embodiments, when determining whether a group is valid, the step of checking the size of the group's prototype against PROTOTYPE_MIN and/or PROTOTYPE_MAX may be omitted.

Whilst the above embodiments have described generating the groups at the step S304 whilst keeping each group's prototype fixed, alternative embodiments of the invention may change a group's prototype time-differential during the step S304. For example, the group's prototype time-differential may be set to be the average of the elements of that group, this being updated each time a new time-differential is added to the group. Alternatively, the group's prototype time-differential may be set to be the time-differential that has been most recently added to the group.

Whilst the above embodiments have described the step S216 as using N consecutive time-differentials to generate a representative frequency, it will be appreciated that the time-differentials used need not always be consecutive time-differentials. For example, N time-differentials may be chosen from a run of M most recent consecutive reliable time-differentials (where M≥N).

It will be appreciated that, insofar as embodiments of the invention are implemented by a computer program, then a storage medium and a transmission medium carrying the computer program form aspects of the invention.

The invention claimed is:

1. A method of determining a representative frequency for data packets, each data packet having an associated time, the method comprising:
   receiving a sequence of time-differentials, wherein a time-differential represents a difference between a timestamp of a corresponding first data packet and a timestamp of a corresponding second data packet;
   setting a value of one of the sequence of time-differentials to be the same values as a previous time-differential in the sequence based on the size of the one of the sequence of time-differentials being more than a threshold size;
   determining the representative frequency based on:
      grouping a predetermined number N of the time-differentials into one or more groups based on magnitudes of the N time-differentials;
      selecting one or more of the one or more groups for use in determining a representative time-differential;
      determining the representative time-differential as a function of the time-differentials of the selected one or more groups; and
      outputting an inverse of the representative time-differential as the representative frequency; and
   performing a frame-rate conversion from a current frame-rate of an input video to an output frame-rate based on the representative frequency.

2. A method according to claim 1, comprising:
   until the received time-differentials comprise N successive time-differentials that have been derived from error-free data packets:
      filtering at least some of the received time-differentials to determine a representative time-differential; and
      outputting an inverse of the representative time-differential as a representative frequency.

3. A method according to claim 2, comprising, at said filtering, limiting the determined representative time-differential to lie in a range of values determined by a previously generated representative time-differential.

4. A method according to claim 1, in which the N time-differentials that are grouped are N successive time-differentials that have been derived from error-free data packets.

5. A method according to claim 4, in which the same N time-differentials are used to determine a predetermined number W of successive representative frequencies.

6. A method according to claim 1, in which said grouping is performed such that the time-differentials of a group are within a predetermined range around a specific one of the time-differentials of that group.

7. A method according to claim 1, in which said selecting comprises:
   determining that a group can be used in determining the representative time-differential if the group contains more than a threshold number of time-differentials.

8. A method according to claim 1, in which said selecting comprises:
   determining that a group can be used in determining a representative time-differential if the time-differential on which that group was initially defined lies in a predetermined range of values.

9. A method according to claim 1, comprising:
if the total number of time-differentials in the groups that have been selected is less than a threshold number, selecting all of the groups for use in determining the representative time-differential.

10. A method according to claim 1, in which the function of the time-differentials of the selected one or more groups is an average of the time-differentials of the selected one or more groups.

11. A method according to claim 10, in which the average is defined by one of the following equations, in which n represents the number of time-differentials selected, $\{a_i=1 \ldots n\}$ represent the n time-differentials selected, and b represents the representative time-differential:

$$b = \frac{1}{n}\sum_{i=1}^{n} a_i;$$

or $$b = \left(\prod_{i=1}^{n} a_i\right)^{1/n};$$

or $$b = \frac{n}{\sum_{i=1}^{n} \frac{1}{a_i}};$$

or $$b = \left(\frac{1}{n}\sum_{i=1}^{n} a_i^p\right)^{1/p}$$

where p is non-zero.

12. A method according to claim 1, in which the data packets are RTP data packets.

13. A method according to claim 1, in which the time associated with a data packet is a transmission time of that data packet or a time at which the data of that data packet was originally captured.

14. A method of determining a video frame rate of packetised video data, the method comprising:
determining a frequency of the video data packets using a method comprising:
receiving a sequence of time-differentials, wherein a time-differential represents a difference between a timestamp of a corresponding first data packet and a timestamp of a corresponding second data packet;
setting a value of one of the sequence of time-differentials to be the same values as a previous time-differential in the sequence based on the size of the one of the sequence of time-differentials being more than a threshold size;
determining the representative frequency based on:
grouping a predetermined number N of the time-differentials into one or more groups based on magnitudes of the N time-differentials;
selecting one or more of the one or more groups for use in determining a representative time-differential;
determining the representative time-differential as a function of the time-differentials of the selected one or more groups; and
outputting an inverse of the representative time-differential as the representative frequency;
performing a frame-rate conversion from a current frame-rate of an input video to an output frame-rate based on the representative frequency;
determining the video frame rate to be the determined frequency.

15. A method of converting packetised video data to a desired video frame rate, the method comprising:
determining a video frame rate of the packetised video data, the determining video frame rate comprising:
determining a frequency of the video data packets, the determining a frequency comprising:
receiving a sequence of time-differentials, wherein a time-differential represents a difference between a timestamp of a corresponding first data packet and a timestamp of a corresponding second data packet;
setting a value of one of the sequence of time-differentials to be the same values as a previous time-differential in the sequence based on the size of the one of the sequence of time-differentials being more than a threshold size;
determining the representative frequency based on:
grouping a predetermined number N of the time-differentials into one or more groups based on magnitudes of the N time-differentials;
selecting one or more of the one or more groups for use in determining a representative time-differential;
determining the representative time-differential as a function of the time-differentials of the selected one or more groups; and
outputting an inverse of the representative time-differential as the representative frequency;
performing a frame-rate conversion from a current frame-rate of an input video to an output frame-rate based on the representative frequency;
determining the video frame rate to be the determined frequency; and
performing frame rate conversion on the packetised video data based on the determined video frame rate and the desired video frame rate.

16. A method of determining a speed of an object represented within packetised video data, the method comprising:
receiving data representing a distance D that the object has moved within a number F of video frames;
determining a video frame rate R of the packetised video data, the determining a video frame rate R comprising:
determining a frequency of the video data packets, the determining a frequency comprising:
receiving a sequence of time-differentials, wherein a time-differential represents a difference between a timestamp of a corresponding first data packet and a timestamp of a corresponding second data packet;
setting a value of one of the sequence of time-differentials to be the same values as a previous time-differential in the sequence based on the size of the one of the sequence of time-differentials being more than a threshold size;
determining the representative frequency based on:
grouping a predetermined number N of the time-differentials into one or more groups based on magnitudes of the N time-differentials;
selecting one or more of the one or more groups for use in determining a representative time-differential;
determining the representative time-differential as a function of the time-differentials of the selected one or more groups; and
outputting an inverse of the representative time-differential as the representative frequency; and
performing a frame-rate conversion from a current frame-rate of an input video to an output frame-rate based on the representative frequency;
determining the video frame rate to be the determined frequency; and
determining the speed based on the formula R*D/F.

17. A non-transitory computer readable medium tangibly embodying a plurality of instructions to manipulate a processor to perform a method, the method comprising:
- receiving a sequence of time-differentials, wherein a time-differential represents a difference between a timestamp of a corresponding first data packet and a timestamp of a corresponding second data packet;
- setting a value of one of the sequence of time-differentials to be the same value as a previous time-differentials in the sequence based on the size of the selected one of the sequence of time-differentials being greater than a threshold size;
- determining the representative frequency based on:
  - grouping a predetermined number N of the time-differentials into one or more groups based on magnitudes of the N time-differentials;
  - selecting one or more of the one or more groups for use in determining a representative time-differential;
  - determining the representative time-differential as a function of the time-differentials of the selected one or more groups; and
  - outputting an inverse of the representative time-differential as the representative frequency; and
- performing a frame-rate conversion from a current frame-rate of an input video to an output frame-rate based on the representative frequency.

18. A data processor comprising:
a memory to store a plurality of instructions; and
a processor to execute the plurality of instruction to manipulate the processor to perform a plurality of steps, the steps including:
- receive a sequence of time-differentials, wherein a time-differential represents a difference between a timestamp of a corresponding first data packet and a timestamp of a corresponding second data packet;
- set a value for one of the sequence of time-differentials to be the same value as a previous time-differentials in the sequence based on the size of the one of the sequence of time-differentials being greater than a threshold size;
- determine the representative frequency based on:
  - group a predetermined number N of the time-differentials into one or more groups based on magnitudes of the N time-differentials;
  - select one or more of the one or more groups for use in determining a representative time-differential;
  - determine the representative time-differential as a function of the time-differentials of the selected one or more groups; and
  - output an inverse of the representative time-differential as the representative frequency;
- determining a frame rate of video data based on the representative frequency;
- receiving a distance that an object moved within a particular number of video frames; and
- determining a velocity of the object based on the frame rate of the video, the distance that the object move, and the particular number of video frames.

* * * * *